United States Patent [19]

Smargiassi

[11] Patent Number: 5,426,925

[45] Date of Patent: Jun. 27, 1995

[54] BIOMAGNET COVERING FOR ANIMALS

[76] Inventor: Larita A. Smargiassi, 32 Ellis Rd., Milford, N.J. 08848

[21] Appl. No.: 158,455

[22] Filed: Nov. 29, 1993

[51] Int. Cl.⁶ .................... B68C 5/00; A01K 13/00
[52] U.S. Cl. ............................... 54/79.1; 119/850; 54/66; 600/15
[58] Field of Search ............... 54/66, 79.1, 79.4, 82; 224/905; 119/850; 600/15

[56] References Cited

U.S. PATENT DOCUMENTS

| | | | |
|---|---|---|---|
| 720,839 | 2/1903 | O'Neil | 54/79.2 |
| 843,349 | 2/1907 | Moore | 224/905 X |
| 4,330,892 | 5/1982 | Fukushima | 600/15 X |
| 4,587,956 | 5/1986 | Griffin et al. | 600/15 |
| 5,226,185 | 7/1993 | Guay et al. | 600/15 X |
| 5,304,111 | 4/1994 | Mitsuno et al. | 600/15 X |

FOREIGN PATENT DOCUMENTS

| | | | |
|---|---|---|---|
| 100050 | 2/1984 | European Pat. Off. | 600/15 |
| 8401517 | 4/1984 | WIPO | 600/15 |

OTHER PUBLICATIONS

"Clinical Studies on Magnetized Mattresses", Dr. Kazuo Shimodaira, Tokyo Communications Hospital Obstetrics and Gynecology, 22 pages (undated).

"Bio-Magnetic Therapy—New Applications for the Treatment of Pain, Fatigue, and Sleep Disorders", Robert Lang, M.D., 2 pages (undated).

"The New Flexible Magnetic Pads. Not Just New and Different—but BETTER", Vincent Ardizzone, EE, 2 pages, Oct. 1, 1992.

"Abstracts: Magnetics: Theraputic Uses From Compuserve Data Base", Beth Isreal Hospital, Boston, Mass., Teaching Hospital, Harvard Medical School, 7 pages (undated).

Primary Examiner—Robert P. Swiatek
Attorney, Agent, or Firm—Kenneth P. Glynn

[57] ABSTRACT

A biomagnet covering for animals. It includes a flexible cover material having a shape adapted to conform to a body of a domesticated animal, and a plurality of magnets connected to the flexible cover material in a predetermined pattern. The flexible cover material is selected from the group consisting of natural woven material, synthetics woven material, blends of natural and synthetic material, natural non-woven material, synthetic non-woven material and combinations thereof. The magnets may be arranged in alternating pole checkerboard patterns, may be bar magnets, or concentric pole magnets. They may be ceramic-based magnets, or ferrite magnets. In one embodiment, the covering has magnets arranged in a pattern which includes a linear portion for placement upon a backbone of an animal.

16 Claims, 2 Drawing Sheets

BIOMAGNET COVERING FOR ANIMALS

BACKGROUND OF THE INVENTION

1. Field of the Invention

The present invention is directed to the use of biomagnetics for animals and more particularly to coverings for animals having magnets arranged in predetermined patterns to enhance the health and well-being of animals.

2. Information Disclosure Statement

Biomagnetics is relatively new as a commercial application of magnets. It is now known and recognized that selective placement on strategic locations of humans has had some positive influence on the treatment of various ailments, including arthritic conditions and circulatory problems. Dr. Kazuo Shimodaira of the Tokyo Communications Hospital, Obstetrics and Gynecology, published a report entitle, "Clinical Studies On Magnetized Mattresses" which summarized the study of therapeutic effects of the magnetized health mattress of Nippon Athletic Industry Co., Ltd. He concluded, based on studies in two hospitals with 375 patients, that the magnetized health mattress proved to be effective on neck and shoulder pain (stiff shoulder), lower back pain, back pain, lower limbs pain, insomnia, and fatigue, with no observed side effects. Dr. Robert Lang, likewise, published a report entitled, "Bio-Magnetic Therapy—New Applications For Treatment of Pain, Fatigue and Sleep Disorders" which supports biomagnetics for ailing patients. Vincent Ardizzone published a brief paper in October, 1992 entitled, "The New Flexible Magnetic Pads—Not Just New and Different, but Better", which describes deeper penetration into the human body using checkerboard patterns. Beth Israel Hospital, Boston, Mass., Teaching Hospital, Harvard Medical School, has published *Abstracts: Magnetics: Therapeutic Uses from Compuserve Data Base* which samples selected abstracts on the benefits and back benefits of magnetics as applied to various ailments.

The present invention device, which is a biomagnetic covering for animals, is neither taught nor suggested in the aforesaid prior art.

SUMMARY OF THE INVENTION

The present invention is a biomagnet covering for animals. It includes a flexible cover material having a shape adapted to conform to a body of a domesticated animal, and a plurality of magnets connected to the flexible cover material in a predetermined pattern. The flexible cover material is selected from the group consisting of natural woven material, synthetics woven material, blends of natural and synthetic material, natural non-woven material, synthetic non-woven material and combinations thereof. The magnets may be arranged in alternating pole checkerboard patterns, may be bar magnets, or concentric pole magnets. They may be ceramic-based magnets, or ferrite magnets.

In one embodiment, the covering has magnets arranged in a pattern which includes a linear portion for placement upon a backbone of an animal.

BRIEF DESCRIPTION OF THE DRAWINGS

The present invention is more fully understood when the specification herein is taken in conjunction with the drawings appended hereto, wherein.

DETAILED DESCRIPTION OF THE PRESENT INVENTION

The present invention biomagnetic covering for animals is generally used for treating domestic animals with magnetic fields without the need for electric power, in a natural presentation.

The coverings may be in the form of blankets, coats, animal vests, half coats, neckpieces, saddle pads, leg wrappings, saddle bags, etc. They may be made of synthetic materials or natural materials or combinations of these and may be woven or non-woven. They may be wool, cotton, polyester, leather, alpaca, or any other animal covering material and may even be insulated.

The magnets may be sewn in or pocketed or heat sealed within a pocket or otherwise attached by any available known means. They could even have thread holes and be sewn on like buttons. In some preferred embodiments, the covering is multilayered and the magnets are positioned and hold by stitching or pocketing, therebetween.

The magnets themselves may be bar magnets, magnetic pads (plastic-coated), concentric, alternating pole, checkerboard, or otherwise, and may be metal, or composite such as ferrite or ceramic-based (cermets).

The magnets will have powers selected in accordance with the size and needs of the animal. For example, smaller animals may respond to 100 to 500 gauss magnets while horses may respond to 500 gauss to 1200 gauss or higher magnets. Typically, the magnets will be in the 200 to 1000 gauss range. They may be circular, rectangular, square or otherwise shaped and may be those which are commercially available.

The number and placement of the magnets will depend upon the animal and the purpose or application. The magnets may be arranged in predetermined patterns based on acupuncture locations. In general, if the covering is for overall well-being and/or back problems, a covering having a backbone row of magnets will be appropriate. For horses, dogs, and farm animals of the four-legged variety, lateral rows directed away from a backbone-based center line, especially in the rear portion, is beneficial. Thus, a covering with a spiral row and lateral rows extending backwardly, is useful for many animals. Other configurations are also beneficial, as mentioned, e.g. half coat and saddle pad configurations with magnets therein.

Figure 1:
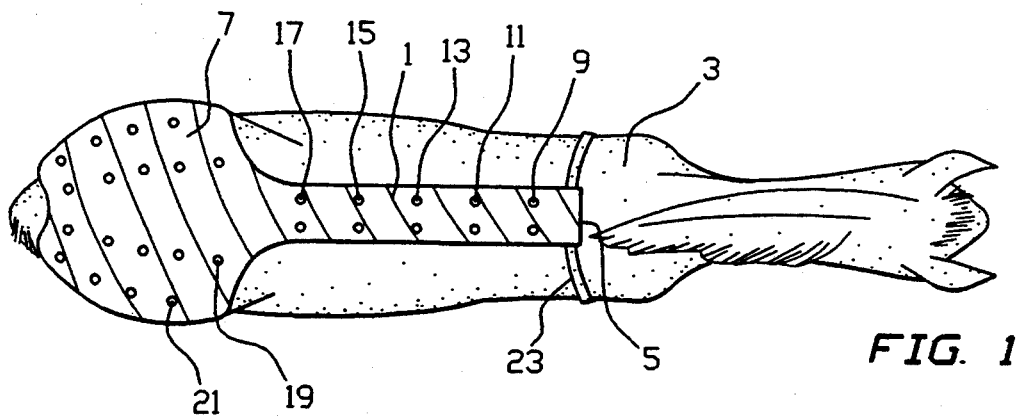
FIG. 1 shows a top view of an animal with one form of a present invention biomagnetic covering useful for domestic animals such as dogs ponies, horses and farm animals.

Referring now to FIG. 1, there is shown present invention biomagnetic covering 1 on pony 3. Covering 1 is formed of a double layered woven cotton polyester blend cover material 7 and includes two rows of spiral column magnets, one such row being magnets 9, 11, 13, 15 and 17. There are also hind quarter magnets arranged laterally as illustrated by the row of magnets 19 and 21. Covering front section 5 may be held in place by strap 23, having a conventional buckle (not shown).

Figure 2:
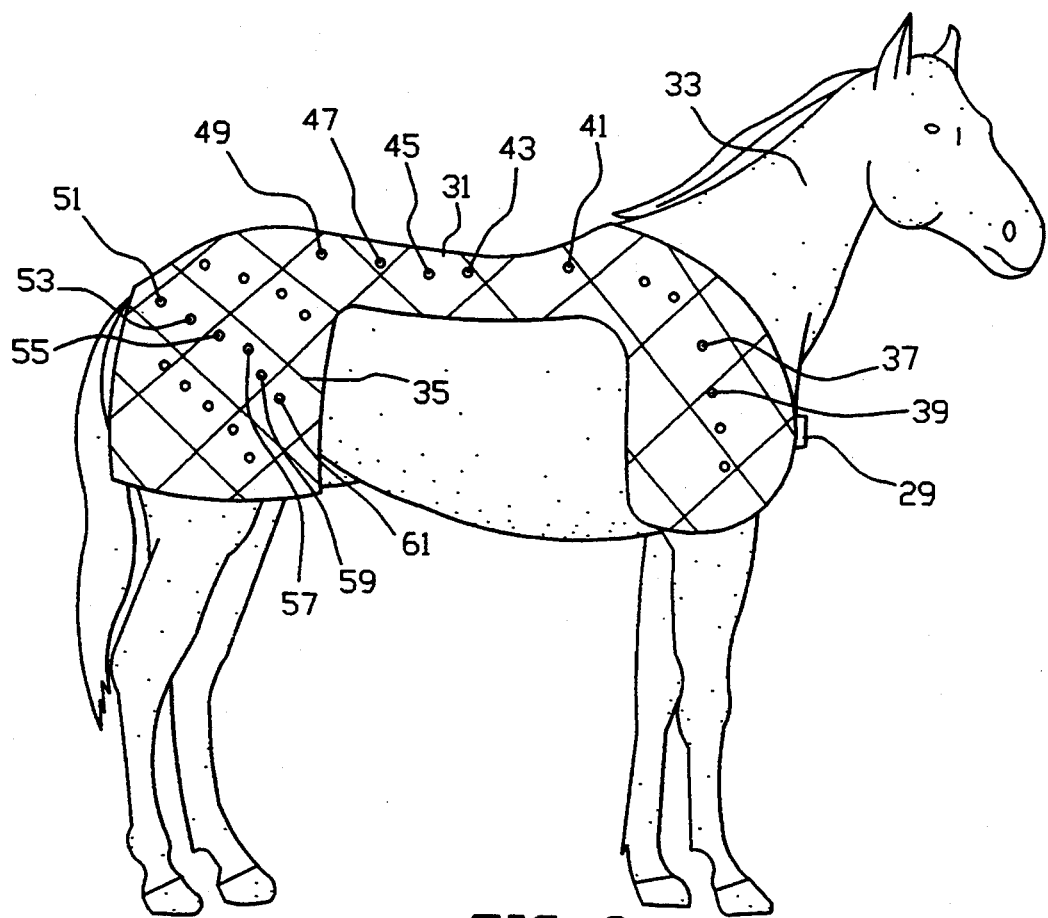
FIG. 2 shows a side view of a horse with a present invention biomagnetic covering.

FIG. 2 shows a side view of horse 33 and alternative embodiment covering 31. Here, all four shoulder areas are treated biomagnetically. As can be seen, covering 31 is in the shape of a coat and is formed generally of insulated synthetic materials 35 with magnets sewn therein. There are foreside magnets such as magnets 37 and 39, as well as spinal column magnets 41, 43, 45, 47 and hindside magnets in lateral rows such as magnets 51, 53, 55, 57, 59 and 61. Strap 29 aids in preventing the cover 31 from sliding backward or sideways to maintain steady therapy.

Figure 3:
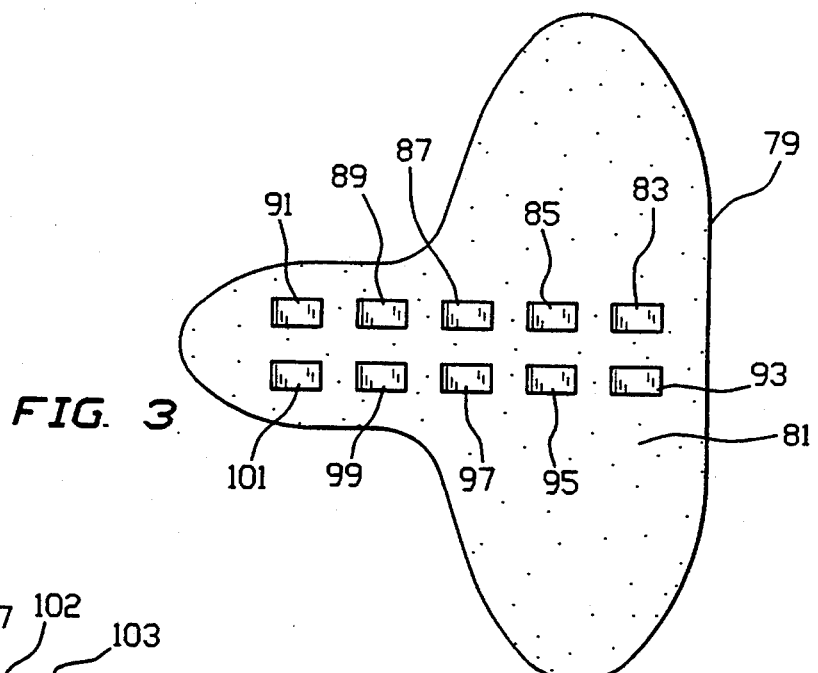
FIG. 3 shows a top spread view of a present invention biomagnetic saddle pad.

FIG. 3 illustrates a top view of a spread, present invention, biomagnetic saddle pad 79, formed of double layered matting which is glued together with magnets located therebetween and glued in place. As can be seen, two rows of spiral column magnets, set 83, 85, 87, 89, 91 and set 93, 95, 97, 99 and 101 form the biomagnetic pattern.

Figure 4:
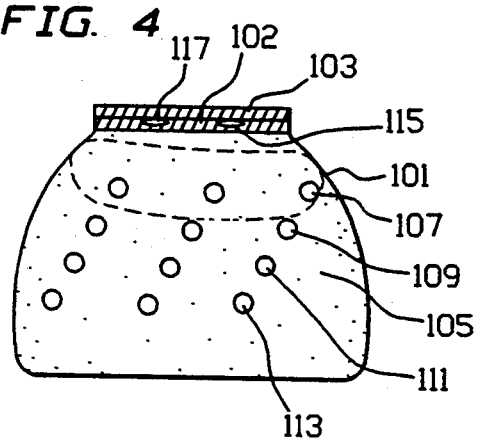
FIG. 4 illustrates a side cut view of the inside of half of a present invention biomagnetic saddle; and, FIG. 5 shows a side view of a present invention biomagnetic coat for domestic four legged animals.

FIG. 4 shows a side cut view of a half of saddle bag 101 connecting panels 102 and 103, glued or stitched together would pass over the back of a horse and attach to a second mirror image bag (not shown). Magnets 107, 109, 111 and 113 form a representative lateral row embedded in the layers of leather 105. There are also topside magnets 115 and 117, as shown. (Note that in this figure, as in all figures, the magnets make raised ares and so are shown in solid lines rather than dotted lines).

Figure 5:
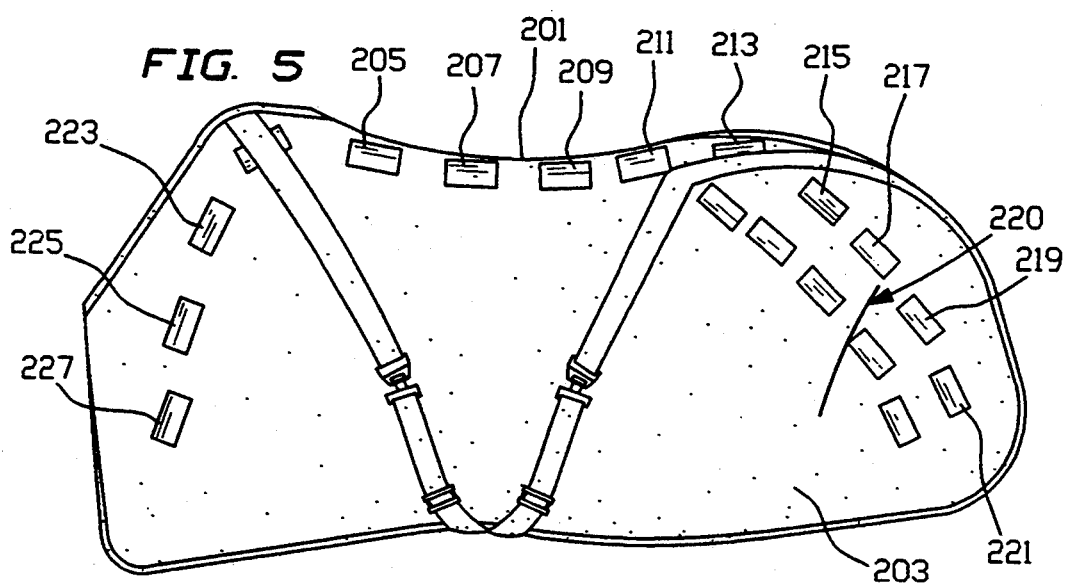

FIG. 5 illustrates an alternative embodiment side view of a coat having rear-based darts for horses, dogs, cats, cattle, sheep (particularly after sheering). Here, coat 201 is made of layers of fabric 203 with spinal column magnets 205, 207, 209, 211 and 213. Hind quarter lateral rows such as magnets 215, 217, 219 and 221 are included, as are forequarter magnets 223, 225 and 227. Symmetrically opposite magnets are located on the other side of coat 201, not shown. Darts on each side such as dart 220, are included.

Present invention coverings have been built and placed on horses suffering from spinal and related ailments, and, after weeks of continuous treatment, marked improvements were observed.

Obviously, numerous modifications and variations of the present invention are possible in light of the above teachings. It is therefore understood that within the scope of the appended claims, the invention may be practiced otherwise than as specifically described herein.

What is claimed is:

1. A biomagnet covering for horses, which comprises:
   (a) a coat which includes a flexible cover material having a non-rectangular shape to a body of a horse including a shape of at least a portion of a horse torso and at least one of a horse torso frontal area and rear area; and,
   (b) a plurality of magnets connected to said flexible cover material in a predetermined pattern which includes rows of laterally positioned magnets, each of said magnets having a power in the range of 500 to 1200 gauss.

2. The covering of claim 1 wherein said flexible cover material is in the shape of a four-legged animal coat with shoulder areas.

3. The covering of claim 2 wherein magnets are arranged in a pattern which includes a linear portion for placement upon a backbone of an animal.

4. The covering of claim 2 wherein said magnets are arranged in a predetermined pattern based on selected acupuncture locations.

5. The covering of claim 1 wherein said magnets are arranged in a pattern which includes a linear portion for placement upon a backbone of an animal.

6. The covering of claim 1 wherein said flexible cover material is selected from the group consisting of natural woven material, synthetics woven material, blends of natural and synthetic material, natural non-woven material, synythetic non-woven material and combinations thereof.

7. The covering of claim 1 wherein said magnets are magnets having a south pole on one side and a north pole on an opposite side.

8. The covering of claim 1 wherein said magnets arranged in alternating pole checkerboard patterns.

9. The covering of claim 1 wherein said magnets are bar magnets.

10. The covering of claim 1 wherein said magnets are concentric pole magnets.

11. The covering of claim 1 wherein said magnets are ceramic-based magnets.

12. The covering of claim 1 wherein said magnets are ferrite magnets.

13. The covering of claim 1 wherein said flexible cover material is in the shape of a horse blanket having rear-based darts.

14. The covering of claim 13 wherein said magnets are arranged in a pattern which includes a linear portion for placement upon a backbone of an animal.

15. The covering of claim 13 wherein said magnets are arranged in a predetermined pattern based on selected acupuncture locations.

16. The covering of claim 1 wherein said magnets are arranged in a predetermined pattern based on selected acupuncture locations.

* * * * *